US005228906A

United States Patent [19]

Fidler

[11] Patent Number: 5,228,906

[45] Date of Patent: Jul. 20, 1993

[54] MOISTENING AGENT FOR OFFSET PRINTING PLATES

[76] Inventor: Kenneth L. Fidler, 1303 Wheatland Ave., Lancaster, Pa. 17603

[21] Appl. No.: 877,017

[22] Filed: May 1, 1992

[51] Int. Cl.$^5$ .................... C09K 3/18

[52] U.S. Cl. .................... 106/2; 106/124; 106/161; 101/451; 101/461

[58] Field of Search .................... 106/2, 124, 161; 101/451, 461, 465

[56] References Cited

U.S. PATENT DOCUMENTS 2,387,056 10/1945 Buck et al. .................... 106/135

3,877,372 4/1975 Leeds .................... 106/2

4,285,276 8/1981 Fromson et al. .................... 106/2

4,567,131 1/1986 Watkiss .................... 106/2

4,604,952 8/1986 Daugherty .................... 106/2

4,711,670 12/1987 Müller .................... 106/161

*Primary Examiner*—Mark L. Bell

*Assistant Examiner*—Helene Klemanski

*Attorney, Agent, or Firm*—Richard T. Laughlin

[57] ABSTRACT

A moistening agent and method for its use in offset printing plates is described. The agent contains a low molecular weight cationic protein as a water soluble, major component.

5 Claims, No Drawings

MOISTENING AGENT FOR OFFSET PRINTING PLATES

BACKGROUND OF THE INVENTION

The invention relates to a means for the improvement of the moistening of offset printing plates.

Offset printing or surface printing plates have the property of being hydrophilic in the non-printing areas and hydrophobic (oleophilic) in the printing areas. In the course of the printing process, all areas are completely wetted with an aqueous moistening agent, then follows inking with the oily printing ink. The hydrophilic areas wetted by the moistening agent cannot be wetted by the hydrophobic, oily printing ink. In this manner an inked image forms on the plate, which is transferred via a rubber cylinder to the medium, i.e., the material which is to be provided with the printing.

The stability of this moistening agent film, i.e., a certain difference between the specific free surface energy of the printing plate material and the liquid, is essential to a clean distribution of the printing ink. Extensive theoretical descriptions of surface behavior, whose improvement forms the basis of the present invention, are to be found, for example, in Advances in Printing Science and Technology (Proceedings of the 17th International Conference of Printing Research Institutes, Saltsjobadan, Sweden, pp. 229–246, June 1983). Numerous attempts have been made to provide moistening agents with additives to improve wettability and hydrophilizing action. The state of the art is water-soluble synthetic and natural polymers, such as for example short-chain, even polyvalent alcohols, gum arabic, starch, alignates, dextrin, celluloses, and gelatines. In Internat. Bull. (1956, January), pp. 30–35, the use and action of these additives are described.

German published patent application No. OS 26 25 604 describes moistening agents on the basis of alcohol-and-water solutions containing univalent and polyvalent low-alkyl alcohols and glycol ethers, with molecular weights of 170 or less, in which not more than four successive carbon atoms are to be present. These moistening agents contain polyacrylamides, polyacrrylic acids and their salts, together in some cases with hydroxymethyl cellulose, in an amount of 0.001 to 5% by weight. Also added are metal nitrates and organic chelating agents.

According to German examined patent application No. AS 1 105 439, the moistening agent additives consist of silicon dioxide or mixed oxides, and polyvalent alcohols and citrate buffer are added if desired. No further data are given on the nature and manner of operation of the polyvalent alcohols.

In the presence of organic polymers, the polyalcohols have a tendency to form poor films, which interfere with the adsorption of the aqueous moistening agent onto the metal surface of the offset printing plates. Furthermore, these alcohols are problematical on account of their partial swelling action. Unless specific concentrations are precisely maintained, and if the atmospheric temperature and humidity fluctuate, water-soluble polymeric moistener additives of the state of the art often have a negative effect on the print quality as well as on the time the inks require for drying.

U.S. Pat. No. 4,711,670 issued on Dec. 8, 1987 to Walter R. Müller describes a moistening agent which contains a concentration of elastin and/or native collagen soluble in a slightly acid aqueous medium, of 0.01 to 3% of the total weight of the solution. This so-called elastin and native collagen has the property of having a low concentration of amine groups. This absence of amine groups would make the material anionic. Higher concentrations can lead to an undesirable formations of gel to the printing surface, and lower concentrations limits its effectiveness.

The optimum pH of the moistening agent is between 4.5 and 5.5. If the pH is lower, the printing plate can be chemically attacked, with the negative effects appearing in the printing ink and on the paper being printed. Also, the drying of the printing ink is retarded. At a pH above 7, saponification of the binding agent in the printing ink usually occurs.

Known buffers, such as sodium citrate-citric acid mixture or starch citrates, have proven suitable for the stabilization of the pH.

The moistening agent of the prior art patent can be applied to all conventional or alcohol- or spray-dampening rollers in the same way as known for usual agents, for example, gum arabic, carboxy-methyl cellulose or others.

One problem with the prior art moistening agent as described in U.S. Pat. No. 4,711,670, is that it is relatively difficult to extent its commercial possibilities.

An object of the present invention is to create a moistening agent for offset printing plates.

Another object of the present invention is to create a moistening agent for offset printing plates which has substantial commercial possibilities due to improved print quality and extended ink life.

BRIEF SUMMARY OF THE INVENTION

According to the present invention, a moistening agent for an offset printing form is provided. This moistening agent has a formula which contains (percentages are by weight):

A low molecular weight cationic protein 20%±10%
Non-ionic silicone defoamer 0.25%±0.15%
Low molecular weight wetting agent 3.0%±2.0%
Phosphoric acid for pH control 2.5 to 5.5 pH All of the above are stabilized in an aqueous solution.

According to the invention, a method of making the moistening agent is provided. This method includes the steps of:

mixing a composition of the above described low molecular weight cationic protein based solution and defoamer and phosphoric acid in a volume of water at a proportion of 2 to 5 ounces of composition per gallon of water at about 150 to 160 degrees Fahrenheit;

stirring the mixture at a speed of about 1250 revolutions per minute;

cooling the mixture for about 20 minutes to about 100 degrees Fahrenheit; and stirring the cooled mixture for about 7 to 8 minutes.

Advantages of the moistening agent of the invention are indicated hereafter.

A) The moistening agent is alcohol free.

B) The moistening agent is more cost saving than the prior art moistening agent as it uses less ink for a color desired.

C) The moistening agent minimizes an ecological problem by disposal thereof.

D) The moistening agent minimizes operating friction as there is no gum therein which could cause clogging.

E) The moistening agent extends equipment life as compared to the prior art moistening agent.

F) The moistening agent has more commercial possibilities than the prior art moistening agent due to improved print quality and due to extended ink life.

It will be understood that the specification and example are illustrative but not limitative of the present invention, and that other embodiments within the spirit and scope of the invention will suggest themselves to those skilled in the art and are to be considered within the scope of the claims.

What is claimed is:

1. An alcohol free moistening agent for an offset printing form consisting of about 10 to about 30% by weight of low molecular cationic protein as a water soluble component, a defoamer and water, and having a pH of about 2.5 to about 5.5

2. The composition of claim 1 where the pH is controlled by the addition of phosphoric acid.

3. The moistening agent of claim 1 wherein the agent has the following formulation with the percentages being expressed in weight percent:

low molecular weight cationic protein 10 to 30% non-ionic silicone defoamer 0.10 to 0.40% low molecular weight wetting agent 1.0 to 5.0% and sufficient phosphoric acid to adjust the pH to 2.5 to 5.5 pH.

4. The moistening agent of claim 1, wherein the defoamer is a non-ionic silicone.

5. A method of making an alcohol free moistening agent for an offset printing form including the steps of:

making a moistening composition which comprises about 10 to 20% by weight of a low molecular weight cationic protein as a water-soluble component, a defoamer, and a phosphoric acid;

mixing water and the moistening composition in the range of 2 to 5 ounces of moistening composition per gallon of water at a temperature of about 150° F.;

stirring the mixture at a speed of about 1250 revolutions per minute;

cooling the mixture to a temperature of about 100° F. over a time interval of about 20 minutes; and stirring the cooled mixture for about 7 to 8 minutes.

* * * * *